United States Patent
Astvatsatrian et al.

(10) Patent No.: US 6,513,337 B1
(45) Date of Patent: Feb. 4, 2003

(54) SYSTEM FOR MAKING AND DISPENSING COLORED WATER AND COLORED ICE CUBES OF VARYING SHAPES

(76) Inventors: Gaiane Astvatsatrian, 1515 N. Kingsley Dr., Los Angeles, CA (US) 90027; Hovannes Gedleyan, 1515 N. Kingsley Dr., Los Angeles, CA (US) 90027; Jack Jay, 112 W. 9th St., Suite 830, Los Angeles, CA (US) 90015

(*) Notice: Subject to any disclaimer, the term of this patent is extended or adjusted under 35 U.S.C. 154(b) by 0 days.

(21) Appl. No.: 10/224,068

(22) Filed: Aug. 20, 2002

Related U.S. Application Data

(60) Provisional application No. 60/313,678, filed on Aug. 20, 2001.

(51) Int. Cl.[7] ................................................. F25C 1/00
(52) U.S. Cl. .......................... 62/66; 99/517; 426/249; 62/340
(58) Field of Search .......................... 62/66, 342, 340; 99/517, 494; 426/249, 250

(56) References Cited

U.S. PATENT DOCUMENTS

| | | | | | |
|---|---|---|---|---|---|
| 4,548,508 A | * | 10/1985 | Verkler | ..................... | 99/494 |
| 5,018,363 A | * | 5/1991 | Aoki et al. | .................... | 62/390 |
| 5,158,506 A | * | 10/1992 | Kusano et al. | ................ | 62/136 |
| 5,191,773 A | * | 3/1993 | Cassell | ..................... | 62/342 |
| 5,199,278 A | * | 4/1993 | Cocchi | ..................... | 62/343 |
| 5,433,084 A | * | 7/1995 | Kaiser et al. | ................ | 62/306 |
| 5,549,219 A | * | 8/1996 | Lancaster | ..................... | 62/393 |

* cited by examiner

Primary Examiner—William E. Tapolcai
Assistant Examiner—Mohammad M. Ali
(74) Attorney, Agent, or Firm—Goldstein & Lavas, P.C.

(57) ABSTRACT

A system for producing color water and colored ice cubes in various shapes, having a control unit with front panel buttons which allow a user to select a color. Dye reservoirs are provided which are selectively dispensed into a mixing chamber to provide the selected color, where they are combined with water and chilled. The colored water is provided to a dispensing unit which selectively dispenses the colored water, or creates colored ice cubes for subsequent dispensing. Ice trays are removably secured within the dispensing unit to allow various shaped ice cubes to be produced.

10 Claims, 3 Drawing Sheets

SYSTEM FOR MAKING AND DISPENSING COLORED WATER AND COLORED ICE CUBES OF VARYING SHAPES

CROSS REFERENCES AND RELATED SUBJECT MATTER

This application relates to subject matter contained in provisional patent application Ser. No. 60/313,678, filed in the United States Patent Office on Aug. 20, 2001.

BACKGROUND OF THE INVENTION

The present invention relates to a system of making and dispensing colored water and ice cubes and more particularly pertains to allowing ice cubes to be produced in different colors and shapes.

The use of food product enhancements is known in the prior art. More specifically, food product enhancements heretofore devised and utilized for the purpose of enhancing foods are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a system of making colored ice cubes in different colors and shapes, and dispensing such cubes and/or colored water as requested by a user.

In this respect, the method of making colored ice cubes of varying shapes according to the present invention substantially departs from the conventional concepts and designs of the prior art, and in doing so provides an apparatus primarily developed for the purpose of allowing ice cubes to be produced in different colors and shapes.

Therefore, it can be appreciated that there exists a continuing need for a new and improved device which allows a user to select a color, and then allows the user to dispense water having that color, or subsequently dispense ice cubes of that color. In this regard, the present invention substantially fulfills this need.

SUMMARY OF THE INVENTION

In the view of the foregoing disadvantages inherent in the known types of food product enhancements now present in the prior art, the present invention provides an improved method of making and dispensing colored ice cubes and colored water. As such, the general purpose of the present invention, which will be described subsequently in greater detail, is to provide a new and improved method of making colored ice cubes of varying shapes which has all the advantages of the prior art and none of the disadvantages.

To attain this, the present invention essentially comprises a control unit with front panel buttons which allow a user to select a color. Dye reservoirs are provided which are selectively dispensed into a mixing chamber where they are combined with water and chilled. The colored water is provided to a dispensing unit which selectively dispenses colored water, or creates colored ice cubes for subsequent dispensing. Ice trays are removably secured within the dispensing unit to allow various shaped ice cubes to be produced.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method of making and dispensing colored water and colored ice cubes of varying shapes which has all the advantages of the prior art food product enhancements and none of the disadvantages.

It is another object of the present invention to provide a new and improved system for making colored water and colored ice cubes of varying shapes which may be easily and efficiently manufactured and marketed.

It is a further object of the present invention to provide a system for making colored ice cubes of varying shapes which is of durable and reliable construction.

An even further object of the present invention is to provide a new and improved system for making and dispensing colored water and colored ice cubes of varying shapes which is susceptible of a low cost of manufacture with regard to both materials and labor, and which accordingly is then susceptible of low prices of sale to the consuming public, thereby making such a method of making colored ice cubes of varying shapes economically available to the buying public.

Even still another object of the present invention is to provide a new and improved system for making colored ice cubes of varying shapes for allowing ice cubes to be produced in different colors and shapes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference numerals refer to the similar components of the invention through the various drawing figures.

DESCRIPTION OF THE PREFERRED EMBODIMENT

Figure 1:
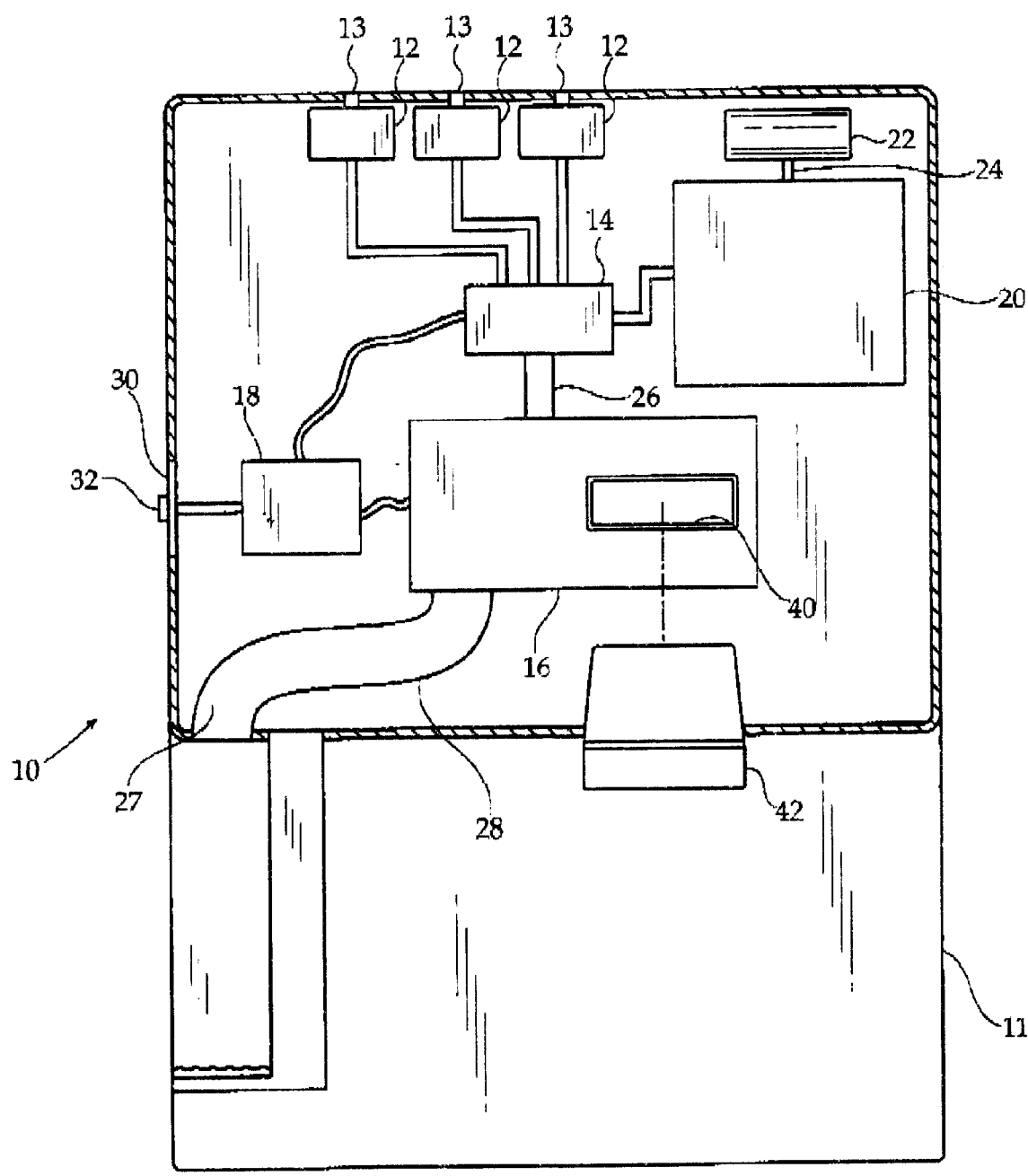
FIG. 1 is a cross sectional view of a freezer containing the preferred embodiment of the present invention, wherein a mold tray is about to be inserted into the ice maker.
Figure 2:
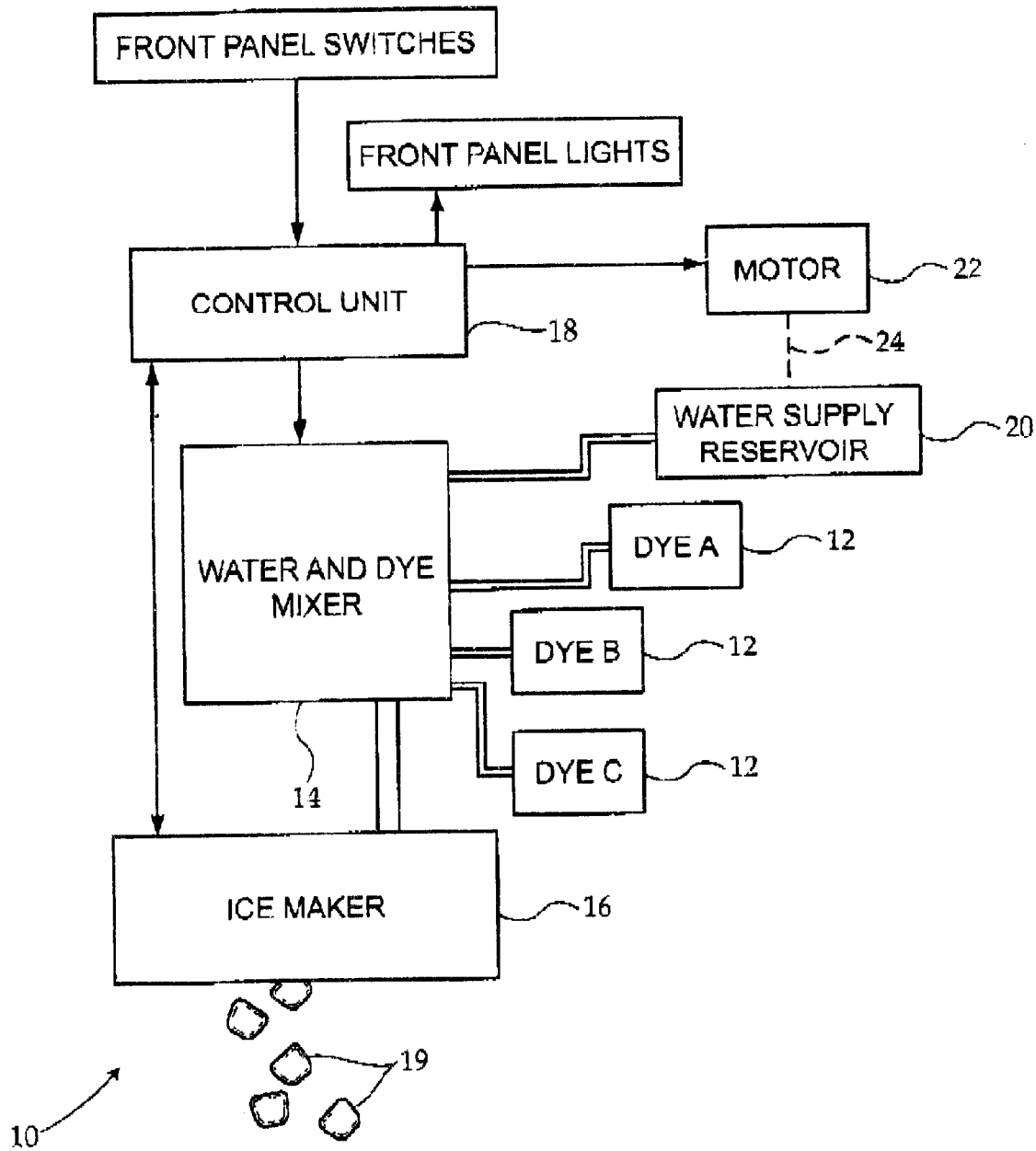
FIG. 2 is a block diagram, illustrating the functional components of the present invention.
Figure 3:
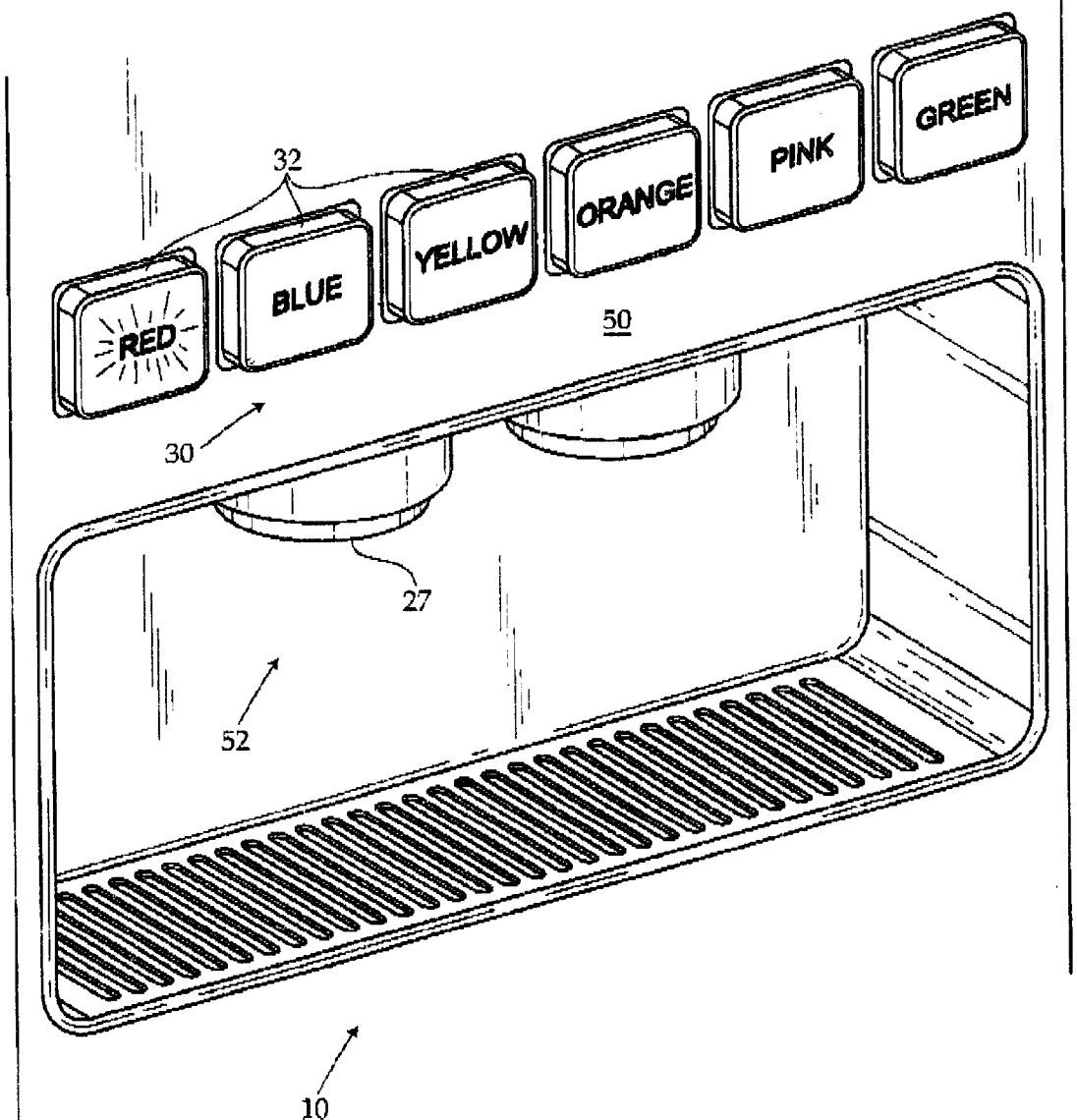
FIG. 3 is a diagrammatic perspective view, illustrating the front panel control buttons and the on-door dispenser according to an embodiment of the present invention.

With reference now to the drawings, and in particular, to FIG. 1, FIG. 2 and FIG. 3 thereof, the preferred embodiment of the system for making and dispensing colored water and colored ice cubes of varying shapes embodying the principles and concepts of the present invention will be described, and generally designated by the reference number 10.

Specifically, it will be noted in the various Figures that the device generally includes dye reservoirs 12, a water and dye mixer 14 which contains a mixing chamber, an ice maker 16, and a control unit 18, which are incorporated within a standard freezer 11.

In particular, the dye reservoirs 12 have fill ports 13 which allow the reservoirs 12 to be filled with food dye, such as vegetable food dye. The dye reservoirs 12 are in communication with the water and dye mixer 14, for selective injection into the mixing chamber. The dye mixer 14 controls the relative proportion of dyes injected into the mixing chamber. As illustrated, preferably three dye reservoirs 12, containing three distinct food dyes can be provided, such as "DYE A", "DYE B", and "DYE C", representing the primary colors. In this fashion, virtually any color can be produced by controlling the proportion of the dyes injected into the mixing chamber.

The mixing chamber receives chilled water from a water supply reservoir 20. If the water supply reservoir 20 is contained within the freezer 11, then a churning motor 22 is provided which has a shaft 24 which extends into the water supply reservoir 20 for agitating water within the water supply reservoir to prevent it from freezing.

The water and dye mixer 14 selectively provides colored water to the ice maker 16 through a mixed water conduit 26. The ice maker 16 produces colored ice cubes 19, which are selectively dispensed through a dispensing outlet 27, through a chute 28. The chute 28 may also be used to dispense chilled colored water from the ice maker as illustrated, or chilled water can be dispensed directly from the mixing chamber by a separate conduit, as would be appreciated by those skilled in the art of the invention. Further, the colored ice can be dispensed into a bin within the freezer 11, so that it may be manually removed by the user.

Accordingly, the control unit 18 controls the injection of dyes from the dye reservoirs 12 by the water and dye mixer 14 into its mixing chamber in order to produce water having a desired color; controls operation of the ice maker 16; and controls dispensing of chilled water and ice cubes from the ice maker 16 and/or mixing chamber. In this regard, front panel controls 30 are provided which allow the user to control the color of ice or water that is mixed, and subsequently dispensed. In particular, as shown in FIG. 3, colors red, blue, yellow, orange, pink, and green have distinct color selection front panel buttons 32, which instruct the control unit 18 as to the user's choice of color. When one of these color selection buttons 32 is pressed, the control unit 18 will carry out the required functionality to inject the dyes into the mixing chamber in order to mix the desired color associated with that color selection button 32.

Additional front panel buttons can be used to control the subsequent dispensing of colored water, or colored ice after produced by the ice maker. Also shown in FIG. 3, the color selection buttons 32 can light up when selected, and will preferably illuminate in the same color as that color selection button indicates. Further, in the case of ice making, the button can be configured to remain illuminated, to notify user's of the color ice that can be dispensed. In the same regard, the button might be configured to flash while ice making is being carried out by the ice maker, and then remain 'steady on' when the ice making has been completed.

Further, as shown in FIG. 1, the ice maker 16 has a tray slot 40, for accommodating ice mold trays 42, which allow the ice maker 16 to produce colored ice cubes 19 having various shapes. Accordingly, the ice mold trays 42 are configured to control the shape of the ice cubes 19.

The standard freezer 11 may of the consumer type, as shown in FIG. 3, having a door 50, having a water and ice dispenser 52 in the door. Such an arrangement would necessitate a slightly different topology than shown in FIG. 1, as it would be desirable to have all components on the door, to avoid 'taking up too much space' within the freezer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A colored water and colored ice cube making and dispensing system, for use with a freezer, comprising:

a water reservoir;

at least two dye reservoirs;

a water and dye mixer within the freezer, having a mixing chamber, the water and dye mixer in communication with the water reservoir and dye reservoirs, the water and dye mixer capable of controlling the selective injection of dye from the dye reservoirs into the mixing chamber;

an ice maker in communication with the mixing chamber for producing ice cubes from water mixed within the mixing chamber; and a control unit for selectively controlling the mixing of the water by the dye mixer to produce water of a desired color, and selectively dispensing ice cubes from the ice maker.

2. The colored water and colored ice cube making and dispensing system as recited in claim 1, further comprising a dispensing outlet, wherein the control unit allows colored ice and colored water to be selectively dispensed through the dispensing outlet.

3. The colored water and colored ice cube making and dispensing system as recited in claim 2, further comprising controls, having color selection buttons allow the user to select the desired color, each color selection button allowing a distinct color to be selected and to initiate mixing of that color by the water and dye mixer.

4. The colored water and colored ice cube making and dispensing system as recited in claim 3, wherein the ice cube maker has a tray slot for accommodating removable ice cube trays, such that ice cube trays having distinctive shapes can be inserted therein.

5. The colored water and colored ice cube making and dispensing system as recited in claim 4, wherein each of the front panel buttons illuminate in their distinct color when pressed.

6. The colored water and colored ice cube making and dispensing system as recited in claim 5, wherein three reservoirs are provided for containing dyes of each of the primary colors.

7. A colored water and colored ice cube method, using a freezer having at least two dye reservoirs containing different colored dyes, a water supply reservoir, a water and dye mixer having a mixing chamber, and an ice maker, comprising the steps of:

selecting a desired color;

mixing colored water in the mixing chamber by the water and dye mixer, water from the water supply reservoir with dye from at least one of the dye reservoirs to make colored water having the desired color; and producing ice by the ice maker with colored water from the mixing chamber.

8. The colored water and colored ice cube method as recited in claim 7, wherein the freezer has front panel controls having color selection buttons, each color selection button associated with a distinct color, and wherein the step of selecting a desired color further comprises pressing one of the color selection buttons by a user.

9. The colored water and colored ice cube method as recited in claim 8, wherein the freezer has a door and a dispensing outlet through the door, and further comprising the step of dispensing the ice cubes through the dispensing outlet.

10. The colored water and colored ice cube method as recited in claim 9, further comprising the step of dispensing chilled colored water from the mixing chamber through the dispensing outlet.

* * * * *